July 7, 1925.  1,544,997
A. A. LAWRENCE ET AL
AUTOMOBILE LIFTING JACK
Filed April 19, 1923   2 Sheets-Sheet 1
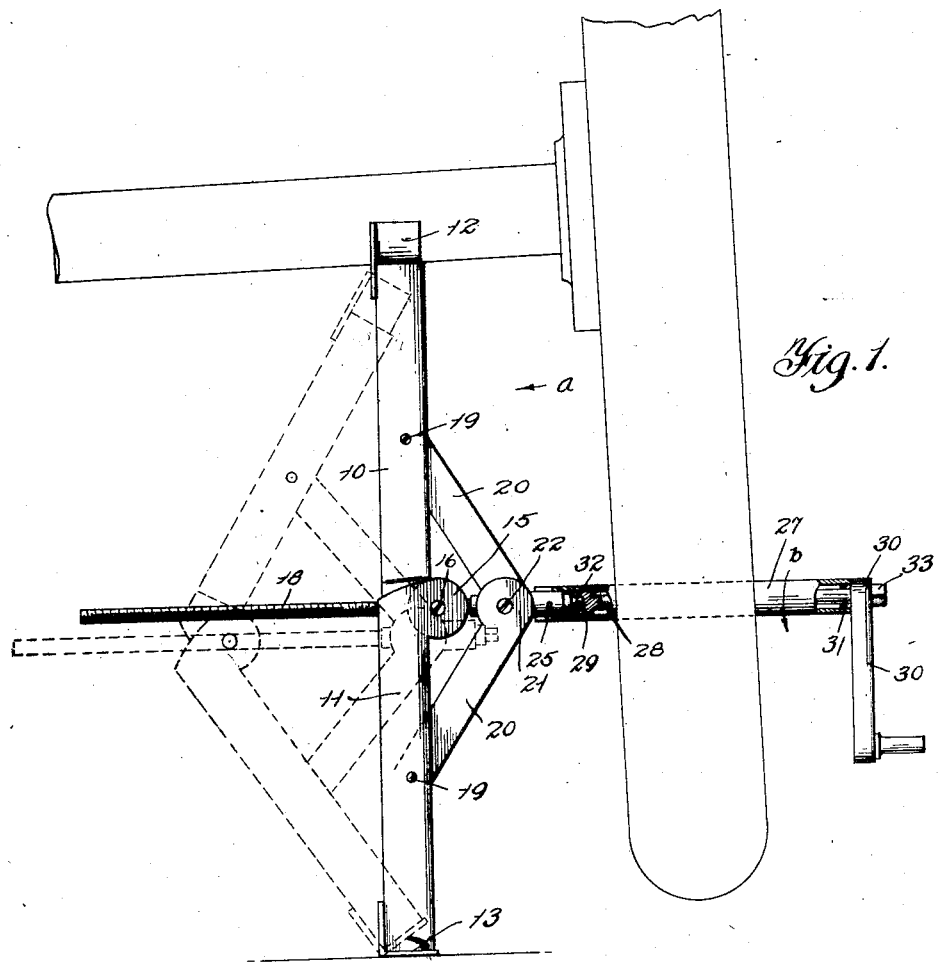
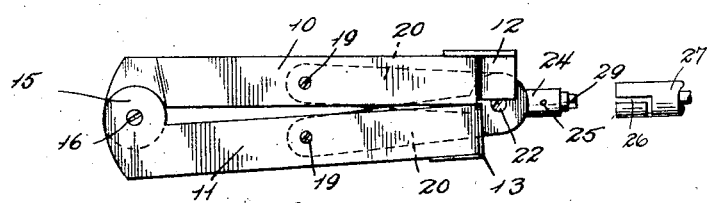
Inventor.
Adolph A. Lawrence
and
Kenneth B. Halverson.

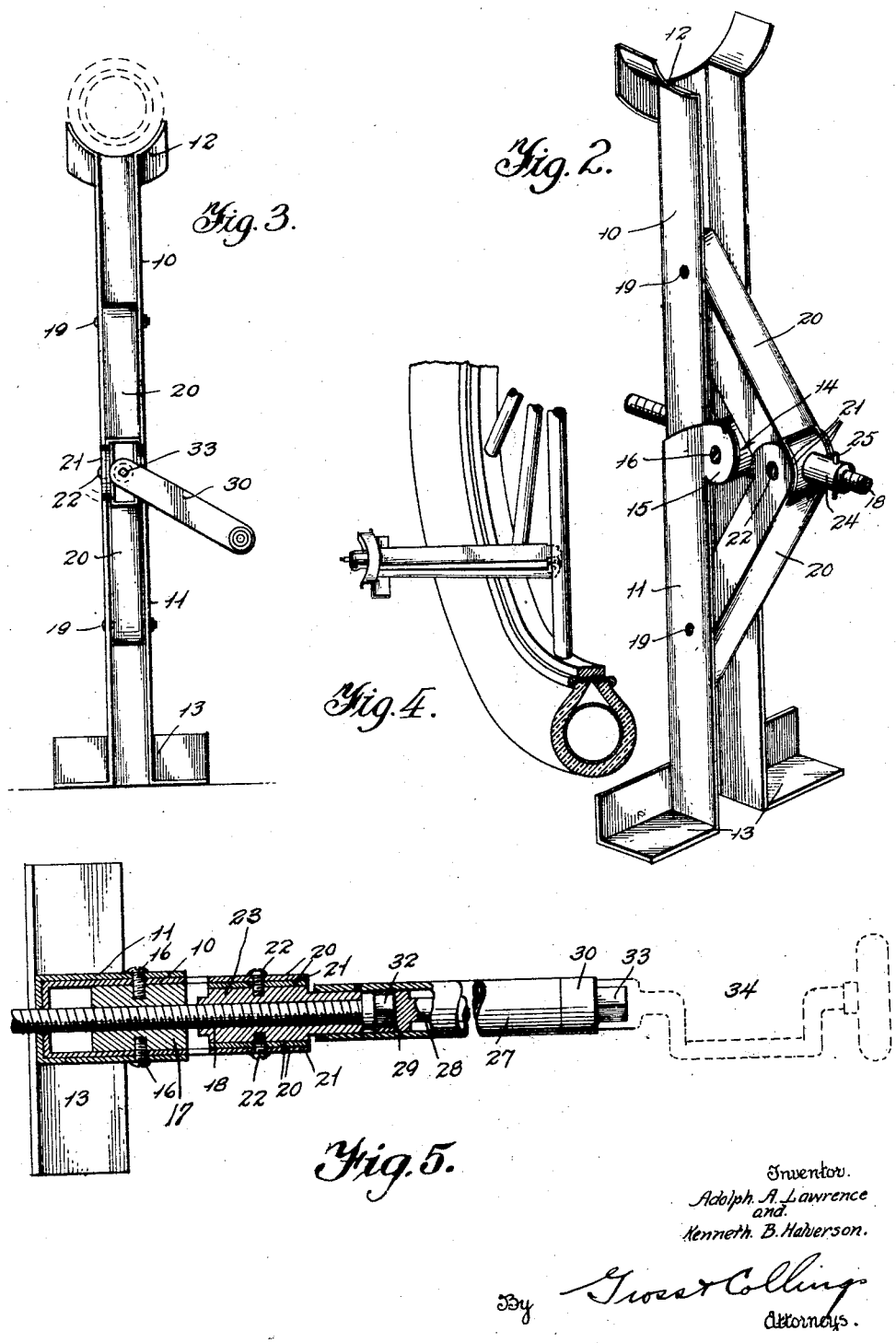

Patented July 7, 1925.

1,544,997

UNITED STATES PATENT OFFICE.

ADOLPH A. LAWRENCE AND KENNETH B. HALVERSON, OF DELAVAN, WISCONSIN.

AUTOMOBILE LIFTING JACK.

Application filed April 19, 1923. Serial No. 633,186.

*To all whom it may concern:*

Be it known that we, ADOLPH A. LAWRENCE and KENNETH B. HALVERSON, citizens of the United States, both residing at Delavan, in the county of Walworth and State of Wisconsin, have invented certain new and useful Improvements in Automobile Lifting Jacks, of which the following is a specification.

This invention relates to jacks, and particularly to a jack adapted for use in connection with automobiles.

One of the objects of our invention is to to provide a jack which may be conveniently and quickly collapsed to a compacted position whereby it may be inserted with facility through the spokes of the wheel of the vehicle, and then moved to extended position to engage the axle of the vehicle and raise the wheel from the ground.

Another object of our invention is to provide an automobile jack having a detachable handle, which, after the jack is raised may be quickly and easily detached, thus permitting the wheel of the vehicle to be rotated without interference, so that different portions of the rim may be worked upon, the wheel being rotated to facilitate this.

Still another object of our invention is to provide an automobile jack so constructed that the parts thereof may, in the collapsed position of the jack, fit within one another, whereby the jack in its collapsed position will occupy a minimum amount of space and may also be quickly and easily inserted between the spokes of practically all types of wheels.

The invention furthermore consists in the novel combination, construction and arrangement of parts, as will be more fully hereinafter set forth as this description proceeds, especially when considered in connection with the accompanying drawings wherein;

Figure 1 is a side elevation of a portion of a vehicle with our improved jack as it appears in use;

Fig. 2 is a perspective view, partly broken away, of the jack;

Fig. 3 is a side elevation of the jack;

Fig. 4 is a perspective view, illustrating the manner in which the jack is inserted between the spokes of the wheel;

Fig. 5 is a horizontal sectional view taken substantially on the line 5—5 of Fig. 1; and, Fig. 6 is a side elevation of the jack in collapsed position.

Referring now more particularly to the drawings wherein like reference characters indicate like parts, it will be noted that the jack consists of two complementary sections, 10 and 11, which are formed preferably of channel-shaped metal bars, these bars being substantially U-shaped in cross section. The upper member is shaped to form a load-receiving portion 12, while the other member 11 is formed with a base or ground engaging portion 13.

The adjacent ends of the jack sections, 10 and 11, are pivotally connected together, this being preferably provided by forming on the jack section 10 a pair of ears 14, and on the jack section 11 a pair of ears 15, which ears are apertured and co-operate to receive pivot bolts 16, which pass through the apertures and engage an operating nut 17, having a longitudinally extending threaded aperture, which operatively engages a threaded rod 18.

Pivotally connected, as at 19, to the jack sections, 10 and 11, is a pair of link members 20, which members are also formed of metal channel bars substantially U-shaped in cross section. It is noted that the outer ends of these link members 20 are pivoted within the channel of the jack sections, 10 and 11. The adjacent ends of the links are formed with ears 21 apertured to receive pivot pins 22 which pivotally connect these link members, these pivot pins engaging a sliding block 23, having a longitudinal bore which loosely engages the operating rod 18.

The sliding block 23 is formed preferably with an elongated shank portion 24, provided with a pair of oppositely extending pins 25. These pins are adapted to engage bayonet-shaped slots 26, formed in the end of a tubular handle member 27. The handle member further comprises a rod 28 having a socket-shaped head 29 on one end thereof, and a handle 30 on the other end thereof, the handle 30 being arranged at the outer end of the tubular handle member 27. A collar 31, arranged in the outer end of the tubular member 27, prevents a withdrawal of the socket rod 28, the handle 30 obviously limiting the movement of the socket rod in the other direction. The socket-shaped head 29 of the rod 28 is adapted to engage the squared end 32, formed on the operating rod 18. The pins 25 and bayonet slots 26 provide a locking engagement between the tubular member 27 and the sliding block 23, as will be immediately apparent.

The end of the socket rod 28, which extends out through the end of the tubular member 27 and to which is secured the handle 30, is squared, as at 33, for the purpose of engagement by the usual socket wrench 34, forming a part of the equipment of automobiles. Obviously, therefore, the socket rod 28 and consequently the operating rod 18 of the jack, may be rotated either by means of the handle 30 or by means of the socket wrench 34.

The manner of using our improved jack will be immediately apparent. With the jack in its collapsed position it may be conveniently inserted between the spokes of the wheel, as clearly illustrated in Fig. 1. The handle member is then attached by causing the bayonet slots 26 of the tubular member 27 to engage the pins 25, carried by the sliding block 23. The socket rod 28 is displaced longitudinally of the tubular member until its socket engages the squared end 32 of the operating rod 18.

Then by rotating the rod 28 by means of the handle 30, the operating rod 18 is rotated, and by reason of its threaded engagement with the nut 17 the jack sections are extended to load-sustaining position. The nut 17, which is engaged by the operating rod 18, is arranged at the point of pivotal connection between the jack sections, and as the rod 18 is rotated, the nut 17 is drawn toward the sliding block, while the sliding block is moved towards the nut 18, this action, because of the connection between the parts by the links 20, tending to straighten the jack sections to a substantially vertical or extended position.

Obviously, little effort is required to rotate the rod 18 until the load-receiving portion 12 and base portion come to firmly engage the load and ground respectively. Therefore, this portion of the operation of the jack may be quickly accomplished by rotating the handle 30. Then, if it is desired, the socket wrench 34 may be caused to engage the squared end 33 of the handle member and the rotation of the operating rod 18 continued, the use of this extra wrench extending the handle somewhat and giving a greater leverage. The rotation of the operating rod 18 is continued until the jack sections have been straightened to a substantially vertical position, and the wheel of the vehicle lifted a sufficient distance from the ground. Thereafter the handle member may be disengaged by disengaging the bayonet slots 26 from the pins 25, thus removing all parts which would interfere with a free rotation of the wheel.

The tire may then be removed and replaced, and the wheel rotated during this operation, without interference at all from the jack.

It should be noted that by inserting the jack from the outside of the vehicle, through the spokes of the wheel, the positioning of the jack under the vehicle and its operation may be handled more conveniently than if it were placed in position and operated from a point in front or at the rear of the vehicle, owing to the position of the mud-guards, fenders, and other portions of the vehicle.

The construction of the jack which enables the same to be reduced to a compact size, not only enables this jack to be conveniently inserted between the spokes of the wheel, but also enables the jack to be stored in the vehicle, occupying during storage a minimum amount of space.

The construction of the jack sections, together with the inter-connecting links and the threaded operating rod, are such as to cause the jack to center itself as it assumes load-sustaining position, the jack being capable of remaining in any of its adjusted positions owing to the fact that the load does not tend to cause the parts to assume collapsed position.

The jack may be constructed cheaply and durably, the use of channel-shaped irons facilitating this. The use of channel members, as the main element of the jack, enables the position of the members in their collapsed position to be superposed, one within the other.

Obvious modifications in the details of construction and the proportion and arrangement of parts may be resorted to without departing from the spirit and scope of the invention, and to this end we make reservation to make such changes as may come within the purview of the accompanying claims.

Having thus described our invention what we claim is:

1. A lifting jack comprising a pair of jack sections formed of channel bars U-shaped in cross section, said jack sections being pivotally connected at adjacent ends, link members pivotally connected to said jack sections with their ends in said channels, a sliding block pivotally connected to the outer ends of said link members, an operating nut connected to said jack sections at their point of pivotal connection and an operating rod for moving said jack to extended position, said parts in collapsed position being superposed within one another.

2. A lifting jack insertable and operable through the spokes of the wheel of a vehicle comprising a pair of jack members U-shaped in cross section, a pair of links pivotally connected to said jack sections and to one another and adapted in the collapsed position of said jack to fit in the channels of said jack members, an operating rod operatively engaging said links and jack members and a detachable handle for operating said rod.

3. A jack of the class described comprising a pair of jack sections U-shaped in cross section, a pair of link members U-shaped in cross section pivotally connected to said jack sections and pivotally connected together, a sliding block secured to said links at their point of pivotal connection, an operating nut secured to said jack sections at their point of pivotal connection, an operating rod passing through said sliding block and engaging said operating nut, said link members in the collapsed position of said jack enclosing said operating rod and fitting within the channel of said jack sections.

4. A jack of the class described comprising a pair of jack sections U-shaped in cross section, a pair of U-shaped link members pivotally connected to said jack sections and pivotally connected together, a sliding block secured to said links at their point of pivotal connection, an operating nut secured to said jack sections at their point of pivotal connection, an operating rod passing through said sliding block and engaging said operating nut, said link members in the collapsed position of said jack enclosing said operating rod and fitting within the channel of said jack sections and a detachable handle extension for rotating said operating rod.

5. A lifting jack of the class described comprising a pair of jack sections, a pair of link members pivotally connected to said jack sections and to one another a sliding block secured to said link members, a rotatable operating rod for operating said jack, a handle member comprising a tubular member, means for detachably connecting said tubular member to said sliding block, a socket rod slidably mounted within said tubular member and adapted to engage said operating rod and a handle for rotating said socket rod.

6. In a lifting jack of the class described a pair of jack sections, a pair of link members pivotally connected to said jack sections and to one another, a sliding block secured to said link members at their point of pivotal connection, a rotatable operating rod for operating said jack members, a handle extension member comprising a tubular member, a bayonet slot and pin connection between said tubular member and said slidable block, a socket rod slidably mounted within said tubular member and adapted to engage a squared end on said operating rod, a handle for rotating said socket rod and a squared end on said socket rod adapted to be engaged by a socket wrench.

In testimony whereof we affix our signatures.

ADOLPH A. LAWRENCE.
KENNETH B. HALVERSON.